United States Patent
Toyooka

(10) Patent No.: US 10,781,986 B2
(45) Date of Patent: Sep. 22, 2020

(54) LOW-GLARE AUTOMOTIVE HEADLIGHT

(71) Applicant: 3M INNOVATIVE PROPERTIES COMPANY, St. Paul, MN (US)

(72) Inventor: Kazuhiko Toyooka, Yamagata (JP)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

(21) Appl. No.: 16/089,752

(22) PCT Filed: Mar. 28, 2017

(86) PCT No.: PCT/US2017/024566
§ 371 (c)(1),
(2) Date: Sep. 28, 2018

(87) PCT Pub. No.: WO2017/172787
PCT Pub. Date: Oct. 5, 2017

(65) Prior Publication Data
US 2019/0120452 A1    Apr. 25, 2019

Related U.S. Application Data

(60) Provisional application No. 62/316,172, filed on Mar. 31, 2016.

(51) Int. Cl.
*F21S 41/135*    (2018.01)
*F21S 43/00*    (2018.01)
(Continued)

(52) U.S. Cl.
CPC ............. *F21S 41/135* (2018.01); *B60Q 1/04* (2013.01); *F21S 41/19* (2018.01); *F21S 43/00* (2018.01); *B60Q 2300/056* (2013.01)

(58) Field of Classification Search
CPC .......... F21S 41/135; F21S 41/19; F21S 43/00; B60Q 1/04; B60Q 2300/056
See application file for complete search history.

(56) References Cited

U.S. PATENT DOCUMENTS 3,631,288 A * 12/1971 Rogers ................ G02B 27/283
313/111
5,976,686 A * 11/1999 Kaytor ...................... C08J 5/18
428/317.9
(Continued)

FOREIGN PATENT DOCUMENTS

JP    2002313113    10/2002
JP    2005041443    2/2005
(Continued)

OTHER PUBLICATIONS

International Search Report for PCT International Application No. PCT/US2017/024566, dated Jul. 12, 2017, 3 pages.

*Primary Examiner* — Mary Ellen Bowman
(74) *Attorney, Agent, or Firm* — 3M IPC

(57) ABSTRACT

Methods for reducing road surface glare from an automotive headlight for an observer not viewing through a polarizing filter are described. The use of a reflective polarizer for reducing road surface glare from an automotive headlight for an observer not viewing through a polarizing filter are also described. A low-beam headlight including a light source, a housing, and a reflective polarizer is also described. The reflective polarizer has a pass axis and the pass axis forms an angle with a road surface between 45 degrees and 135 degrees.

7 Claims, 3 Drawing Sheets

(51) Int. Cl.
  *F21S 41/19*    (2018.01)
  *B60Q 1/04*     (2006.01)

(56) References Cited

U.S. PATENT DOCUMENTS

| | | | |
|---|---|---|---|
| 6,179,456 B1* | 1/2001 | Nakamura | F21V 3/04 |
| | | | 362/510 |
| 2003/0103261 A1* | 6/2003 | Hay | G02B 7/003 |
| | | | 359/352 |
| 2004/0066471 A1 | 4/2004 | Bierhuizen | |
| 2009/0122261 A1* | 5/2009 | Chou | B29D 11/00634 |
| | | | 351/159.62 |
| 2010/0201242 A1 | 8/2010 | Liu | |
| 2013/0155645 A1* | 6/2013 | Marius | G02B 27/281 |
| | | | 362/19 |
| 2019/0063715 A1* | 2/2019 | Chen | F21V 9/14 |

FOREIGN PATENT DOCUMENTS

| | | |
|---|---|---|
| JP | 2009238627 | 10/2009 |
| WO | WO 2006-101712 | 9/2006 |
| WO | WO 2011-091557 | 8/2011 |
| WO | WO 2015-063512 | 5/2015 |

\* cited by examiner

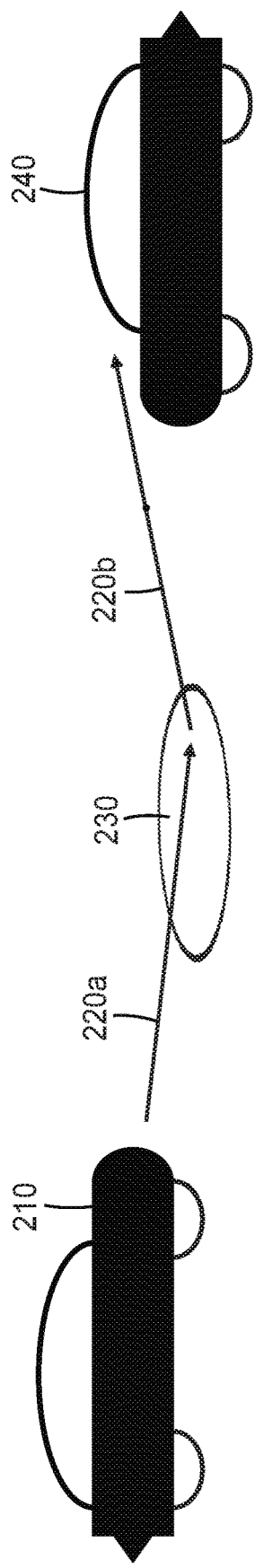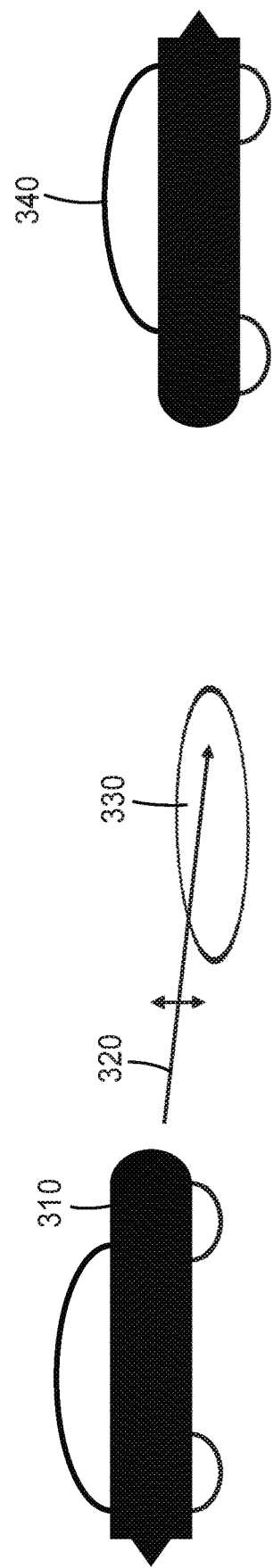

LOW-GLARE AUTOMOTIVE HEADLIGHT

BACKGROUND

Headlights for automobiles serve important safety functions by both providing visibility in front of a driver and also helping other traffic see the driver's vehicle. Headlights are typically very bright, and they can be distracting or temporarily blinding if their light shines or is reflected into one's eyes.

SUMMARY

In one aspect, the present description relates to a method for reducing road surface glare from an automotive headlight for an observer not viewing through a polarizing filter. The method includes disposing a reflective polarizer such that at least some light from a light source of the automotive headlight passes through the reflective polarizer. The reflective polarizer has a pass axis, and the pass axis makes an angle with a road surface in the range from 45 degrees to 135 degrees.

In another aspect, the present description relates to a use of a reflective polarizer on an automotive headlight for reducing road glare for an observer not viewing through a polarizing filter, where the reflective polarizer is disposed such that at least some light from a light source of the automotive headlight passes through the reflective polarizer. The reflective polarizer has a pass axis and the pass axis makes an angle with a road surface in the range from 45 degrees to 135 degrees.

In yet another aspect, the present description relates to a low-beam automotive headlight. The low-beam automotive headlight includes a light source, a housing, and a reflective polarizer. The reflective polarizer is disposed such that at least some light from a light source of the low-beam automotive headlight passes through the reflective polarizer. The reflective polarizer has a pass axis and the pass axis makes an angle with a road surface in the range from 45 degrees to 135 degrees.

BRIEF DESCRIPTION OF THE DRAWINGS

FIG. 2 is a diagram illustrating the polarization of light through reflection off a horizontal surface.

FIG. 3 is a diagram illustrating the suppression of p-polarized light in reflecting off a horizontal surface.

DETAILED DESCRIPTION

Figure 1:
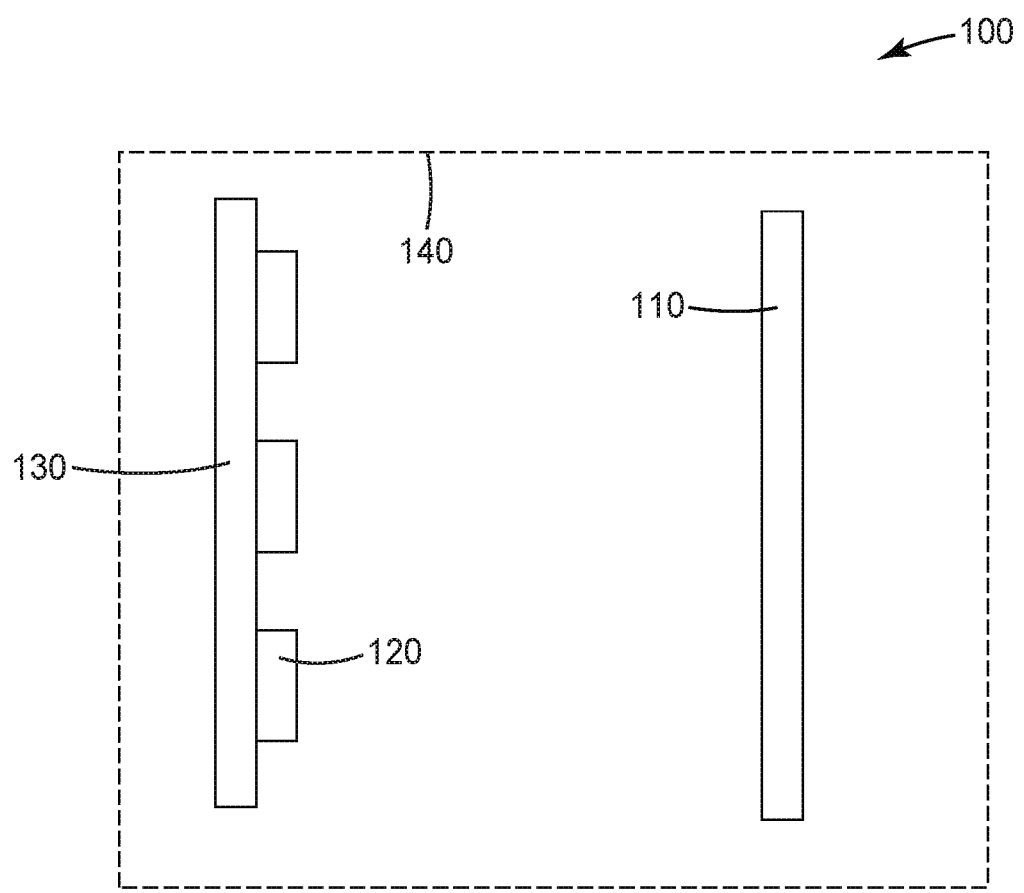
FIG. 1 is a schematic top plan view of an automotive headlight.

Headlights, critical to navigation and safety in low- and no-light driving conditions (e.g., at night or in a storm), need to be bright in order to give the driver the ability to see and assess objects and signs in front of the vehicle. Headlights, during normal operation, are typically oriented to shine primarily downward toward the road surface, in order to provide good forward visibility while minimizing light shined directly at other drivers' (or pedestrians', cyclists', etc.) eyes. However, if a road surface is slick—for example, icy or wet—light directed downwards may be reflected back up toward drivers' eye level. Specular reflections in particular—but diffusely reflected light to some extent—can create a hazard for drivers and others facing the oncoming vehicle.

When unpolarized light is reflected off a surface at a certain angle (depending on the refractive index of the reflective surface), the light that is reflected off the surface is strongly s-polarized. The angle at which this phenomenon takes place is known as Brewster's angle. S-polarized light, with respect to the reflection off the horizontal road surface, corresponds to electromagnetic oscillation (polarization direction) parallel to the road. Polarized or polarizing sunglasses take advantage of this phenomenon and operate through filtering out (absorbing) s-polarized light; or more precisely, light polarized horizontally (parallel to ground surfaces). Because s-polarized light is higher than p-polarized light for a range of angles centered around Brewster's angle, polarized sunglasses selectively reduce the visibility of sources of predominantly s-polarized light. Other objects are still visible through their reflected p-polarized light.

For low-visibility situations, however, the absorption of approximately 50% (by a polarizing filter) of ambient light can reduce visibility of some objects below the threshold of perception. This is why polarized sunglasses are still typically not worn at night, even for glare reduction purposes.

Attempts to selectively filter headlights have centered on the phenomenon of "dazzle," or light from headlights directly incident on observers. These function by a similar principle of operation as polarizing sunglasses; that is, the headlight produces polarized light of one polarization, and the filter blocks or absorbs that polarization. This can be dangerous, however, because any filter would block or absorb about half of unpolarized light as well. Unlike in bright daylight (where polarizing sunglasses are typically worn), this general, overall reduction in brightness is not insignificant and may impart invisibility to otherwise marginally visible objects or light sources. Further, the glare reduction methods are designed to require polarizing filters on the windshield glass of the cars of other drivers. This system is therefore only marginally useful until all or at least most of the vehicles one encounters have polarized headlights and filters. Moreover, these systems contemplate no effect or benefit to those without a vantage point looking through a polarizing filter, such as pedestrians, cyclists, or even simply drivers with standard, non-polarizing glass.

The presently described embodiments take advantage of Brewster's angle in a different manner. Because s-polarized light is reflected while p-polarized light is not, the headlights described herein produce p-polarized light (vertically polarized) that has its specular reflection component, at least at Brewster's angle, completely suppressed at the interface between the air and the reflective surface of the road. Reflection at other interfaces tends to be diffuse (and has a significant absorptive component, with respect to the interface between the reflective road surface and the base road surface, typically darkly pigmented), and therefore is less noticeable and distracting/disorientating, as the total reflected light is both less bright and spread over a wider angular space. This effect can beneficially reduce road glare for any driver or observer, including pedestrians and cyclists, who may not have polarizing filters.

FIG. 1 is a schematic top plan view of an automotive headlight. Automotive headlight 100 includes reflective polarizer 110, light source 120 on mount 130, disposed within housing 140.

Reflective polarizer 110 may be any suitable reflective polarizer and may be any suitable shape and size. In some embodiments, reflective polarizer 110 is adapted to be within housing 140. In some embodiments, reflective polarizer 110 is a multilayer optical film, such as Dual Brightness Enhancement Film (DBEF), available from 3M Company (St. Paul, Minn.). Reflective polarizer 110 may be oriented in any suitable direction. In some embodiments, reflective polarizer 110 may be oriented such that it its transmission axis is substantially perpendicular to a road surface, when place on a vehicle. Substantially perpendicular may mean, for example, exhibiting an angle of between 45 degrees and 135 degrees between the road surface and the transmission axis. In some embodiments, substantially perpendicular may mean within 10 or 5 degrees of 90 degrees.

Light source 120 may be any suitable light source and may include several or many light sources. In some embodiments, light source 120 may be an incandescent bulb, a halogen bulb, a light emitting diode, or metal-halide lamp, or any combination thereof. The one or more of light source 120 may be mounted or otherwise held by mount 130. Mount 130 may be any suitable material capable of holding one or more of light source 120 in place within the headlight. Mount 130 may also shield or hide a portion of the bulb. Light source 120, with or without the aid of mount 130, may be directed at a certain lateral and vertical position. In other words, the automotive headlight may be aimed a certain degree left or right of center, and a certain degree up and down. In some embodiments, the light source may be configured such that the automotive headlight is a high-beam light (that it is oriented to primarily illuminate objects at eye level of the driver or higher). In some embodiments, the light source may be configured such that the automotive headlight is a low-beam headlight (for purposes of this application, that it is oriented to primarily illuminate objects below eye level of the driver, including the road surface). In some embodiments, the light source may be configured such that it can function simultaneously or alternatively between a high-beam headlight and a low-beam headlight. In some embodiments, the light source may be configured such that a portion operates as a high-beam headlight and a portion operates as a low-beam headlight.

Housing 140 refers to the surrounding of the enclosed automotive headlight 100. In some embodiments, certain of the components within the headlight may not be completely distinct from the housing. For example, mount 130 may form a portion of housing 140. In some embodiments, different portions of housing 140 may have different optical properties; for example, in some embodiments, at least a rear portion of housing 140 may be reflective while the rest is transmissive. In some embodiments, the housing is or includes a reflector, such as a silver reflector, a metalized thin film, or a multilayer optical reflector, such as Enhanced Specular Reflector (ESR) available from 3M Company (St. Paul, Minn.). The reflector may be specular, diffuse, or semi-specular (i.e., it may have both a specular component and a diffuse component). In some embodiments, the housing may (with or without the mount) be a parabolic shape. In some embodiments, the housing may be shaped as another focusing or collimating shape. In some embodiments, if the housing has birefringence and light from the light source passes through both the reflective polarizer and then the housing, automotive headlight 100 may also include a waveplate or retarder in order to compensate for the birefringence of the housing (either before or after the housing), and to otherwise provide substantially perpendicularly polarized light, with respect to the road surface.

Reflective polarizer 110 can be placed anywhere within the housing in FIG. 1. In some embodiments, it may be attached to an inner portion of housing 140. In some embodiments, it may be attached or placed near or on light source 120. In some embodiments, it may be a free-floating film within the headlight.

FIG. 2 is a diagram illustrating the polarization of light through reflection off a horizontal surface. Emitting vehicle 210 emits unpolarized incident ray 220a. Incident ray 220a is incident on reflective surface 230 at Brewster's angle (for the air/reflective surface interface), is reflected, and the specularly reflected light is completely s-polarized (horizontally polarized). The s-polarized light is incident on oncoming vehicle 240 and is viewed as glare by a driver in oncoming vehicle 240.

FIG. 3 is a diagram illustrating the suppression of p-polarized light in reflecting off a horizontal surface. In this case, emitting vehicle 310 emits vertically polarized incident ray 320. Incident ray 320 is incident on reflective surface 330 as p-polarized light at Brewster's angle (for the air/reflective surface interface). Because Brewster's angle is where the specular reflection of p-polarized light is forbidden, no incident light is specularly reflected off the interface between the air and the reflective surface.

Figure 4:
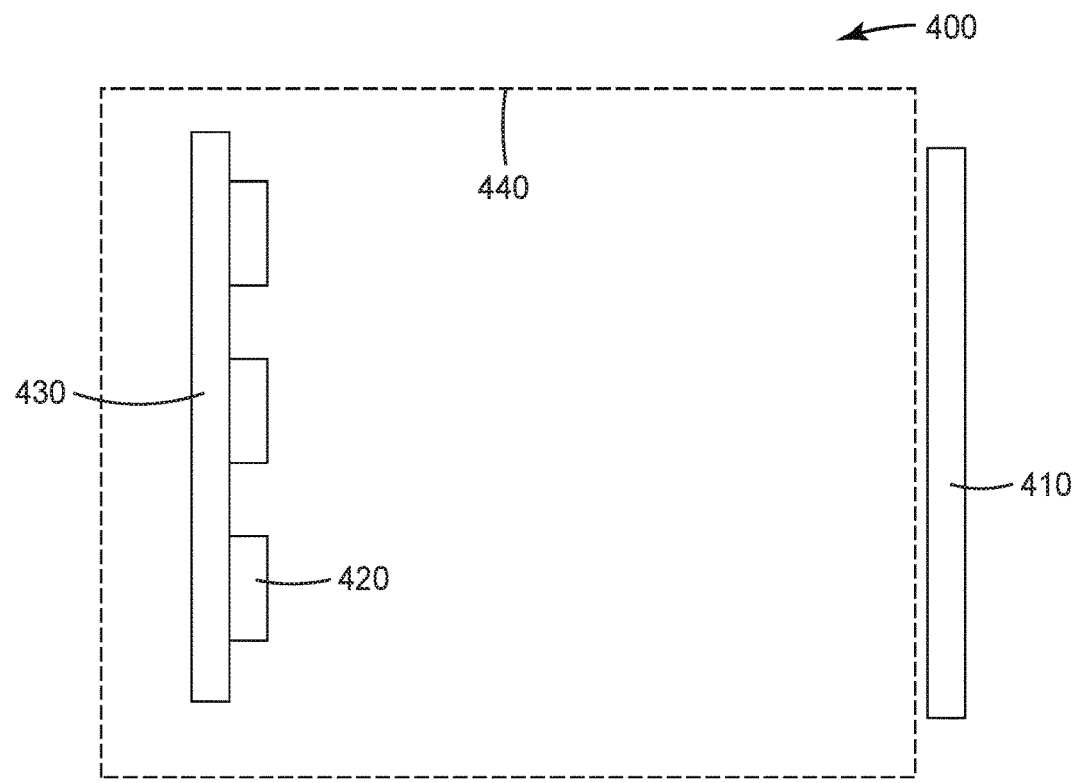
FIG. 4 is a schematic top plan view of another automotive headlight.

FIG. 4 is a schematic top plan view of another automotive headlight. Automotive headlight 400 includes reflective polarizer 410, light source 420, mount 430, and housing 440. Reflective polarizer 410 is disposed on an outer surface of housing. Disposing reflective polarizer 410 on an outer surface of housing 440 may help protect or insulate reflective polarizer 410 from high heat or other potentially performance-degrading exposure to light source 420.

Figure 5:
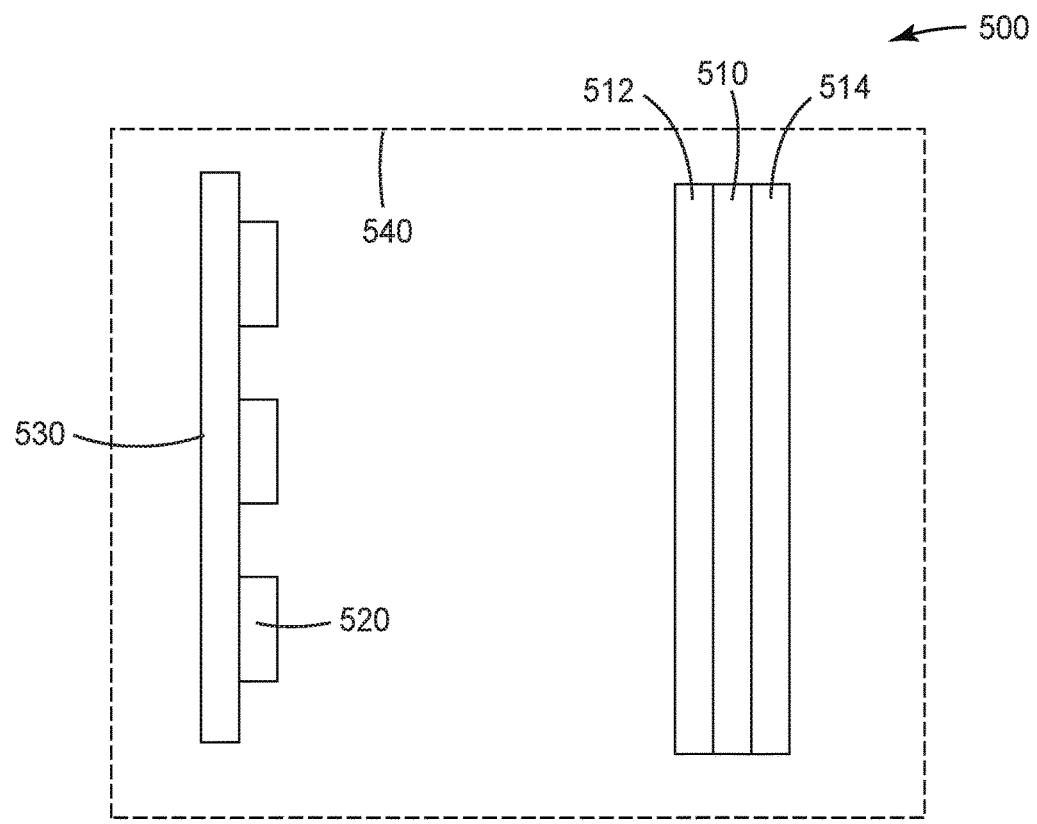
FIG. 5 is a schematic top plan view of another automotive headlight.

FIG. 5 is a schematic top plan view of another automotive headlight. Automotive headlight 500 includes reflective polarizer 510 surrounded by first substrate layer 512 and second substrate layer 514. Automotive headlight 500 also includes light source 520, mount 530, and housing 540. One or both of the substrates may be thick substrate layers. Utilizing thick substrate layers may be beneficial for warp resistance, environmental stability, or ease of handling or installing. In some embodiments, one or both of the substrate layers may be a plastic or resin layer or plate. In some embodiments, one or both of the substrate layers may include a wavelength-specific absorber; for example an ultraviolet absorber. In some embodiments, one or both of the substrate layers may include a light stabilizer. In some embodiments, one or both of the substrate layers may include a downconverter. In some embodiments, one or both of the substrate layers may include a retarder or waveplate or may exhibit birefringence in order to correct for birefringence in a transmissive portion of the housing.

Utilizing a reflective polarizer instead of conventional absorbing polarizers in the embodiments described herein in combination with a reflective surface can increase the efficiency of the headlights. Absorbing polarizers will necessarily absorb half of unpolarized light. However, for a reflective polarizer, light of a non-transmitted polarization are reflected and recycled, and may be rotated and ultimately transmitted after one or more bounces. Accordingly, compared to headlights with absorbing polarizers, light sources may be removed to provide equivalent brightness just by switching from an absorbing polarizer to a reflective polarizer (provided that the back portion of the housing is reflective enough with sufficiently low absorption). Alternatively, higher overall brightness may be achievable while using the same number and type of light sources.

Automotive headlights as described herein may be useful for low-beam headlights where a significant portion of the light is or is intended to be incident on a road surface. Providing a reflective polarizer on these headlights may be useful as a method for reducing road surface glare for observers not viewing through a polarizing filter.

Examples

A Toyota Corolla Fielder automobile, body code NZE141G, with incandescent headlights on was observed and photographed using a 2D Color Analyzer CA-2000 Series (available from Konica-Minolta, Tokyo, Japan) from a distance of 25 meters on a wet asphalt road surface, with headlights on. The photograph used no polarizing filter and captured the reflected light off the wet road surface. Next, a reflective polarizer (DBEF-QV2, available from 3M Company, St. Paul, Minn.) was attached to cover each of the front surfaces of the headlights' cover lens using tape at the edges. The reflective polarizer was aligned such that the transmission axis was perpendicular to the road surface. The automobile was again photographed on a wet road surface from a distance of 25 meters, with headlights on. The photograph used no polarizing filter and captured the reflected light off the wet road surface. It was observed that the addition of the reflective polarizer reduced the intensity of the light reflected off the wet road surface.

The following are exemplary embodiments according to the present disclosure:

Item 1. A method for reducing road surface glare from an automotive headlight for an observer not viewing through a polarizing filter, the method comprising:
disposing a reflective polarizer such that at least some light from a light source of the automotive headlight passes through the reflective polarizer;
wherein the reflective polarizer has a pass axis, and the pass axis makes an angle between a road surface in the range from 45 degrees to 135 degrees.

Item 2. The method of item 1, wherein disposing a reflective polarizer means attaching it to an external surface of a cover lens of the automotive headlight.

Item 3. The method of item 1, wherein disposing a reflective polarizer means attaching it to an internal surface of a cover lens of the automotive headlight.

Item 4. The method of item 1, wherein disposing a reflective polarizer means placing it between the light source and a cover lens of the automotive headlight, but not attaching it to an internal surface of the cover lens.

Item 5. The method of item 1, wherein the reflective polarizer is laminated to at least one substrate.

Item 6. The method of item 5, wherein the substrate is glass or polymeric.

Item 7. The method of item 5, wherein the substrate includes an ultraviolet absorber.

Item 8. The method of item 5, wherein the substrate includes a light stabilizer.

Item 9. The use of a reflective polarizer on an automotive headlight for reducing road surface glare for an observer not viewing through a polarizing filter, wherein the reflective polarizer is disposed such that at least some light from a light source of the automotive headlight passes through the reflective polarizer, and wherein the reflective polarizer has a pass axis and the pass axis makes an angle with a road surface in the range from 45 degrees to 135 degrees.

Item 10. An low-beam automotive headlight, comprising:
a light source;
a housing; and
a reflective polarizer disposed such that at least some light from a light source of the low-beam automotive headlight passes through the reflective polarizer;
wherein the reflective polarizer has a pass axis and the pass axis makes an angle with a road surface in the range from 45 degrees to 135 degrees.

Item 11. The low-beam automotive headlight of item 10, wherein the reflective polarizer is attached to an external surface of a cover lens of the automotive headlight.

Item 12. The low-beam automotive headlight of item 10, wherein the reflective polarizer is attached to an internal surface of a cover lens of the automotive headlight.

Item 13. The low-beam automotive headlight of item 10, wherein the reflective polarizer is disposed between the light source and a cover lens of the automotive headlight, but is not attached it to an internal surface of the cover lens.

Item 14. The low-beam automotive headlight of item 10, wherein the reflective polarizer is laminated to at least one substrate.

Item 15. The low-beam automotive headlight of item 14, wherein the substrate is glass or polymeric.

Item 16. The low-beam automotive headlight of item 14, wherein the substrate includes an ultraviolet absorber.

Item 17. The low-beam automotive headlight of item 14, wherein the substrate includes a light stabilizer.

What is claimed is:

1. A method for reducing road surface glare from an automotive headlight for an observer not viewing through a polarizing filter, the method comprising:
disposing a reflective polarizer on a housing such that at least some light from a light source of the automotive headlight passes through the reflective polarizer, a rear portion of the housing including a reflector;
wherein the reflective polarizer has a pass axis, and the pass axis makes an angle with a road surface in the range from 45 degrees to 135 degrees, such that due to the angular difference between the pass axis and the road surface, an amount of polarized light emitted from the housing before reflecting off of the road surface is greater than an amount of polarized light emitted from the housing after reflecting off of the road surface.

2. The method of claim 1, wherein disposing a reflective polarizer means
attaching it
to an external surface of a cover lens of the automotive headlight.

3. The method of claim 1, wherein disposing a reflective polarizer means
attaching it
to an internal surface of a cover lens of the automotive headlight.

4. The method of claim 1, wherein disposing a reflective polarizer means placing
it
between the light source and a cover lens of the automotive headlight, but not attaching it to an internal surface of the cover lens.

5. The method of claim 1, wherein the reflective polarizer is laminated to at least
one
substrate.

6. The use of a reflective polarizer on an automotive headlight for
reducing road
surface glare for an observer not viewing through a polarizing filter, wherein the reflective polarizer is disposed on a housing, such that at least some light from a light source of the automotive headlight passes through the reflective polarizer, a rear portion of the housing including a reflector, and wherein the reflective polarizer has a pass axis and the pass axis makes an angle with a road surface in the range from 45 degrees to 135 degrees, such that due to the angular difference between the pass axis and the road surface, an amount of polarized light emitted from the housing before reflecting off of the road surface is greater than an amount of polarized light emitted from the housing after reflecting off of the road surface.

7. A method for reducing road surface glare from an automotive headlight for an observer not viewing through a polarizing filter, the method comprising:
  disposing a reflective polarizer on a housing such that at least some light from a light source of the automotive headlight passes through the reflective polarizer; and
  disposing an ultraviolet absorber on the reflective polarizer;
  wherein the reflective polarizer has a pass axis, and the pass axis makes an angle with a road surface in the range from 45 degrees to 135 degrees, such that due to the angular difference between the pass axis and the road surface, an amount of polarized light emitted from the housing before reflecting off of the road surface is greater than an amount of polarized light emitted from the housing after reflecting off of the road surface.

* * * * *